(12) United States Patent
Barth et al.

(10) Patent No.: US 10,946,497 B2
(45) Date of Patent: Mar. 16, 2021

(54) PROCESSING TOOL, PARTICULARLY A ROLL TOOL, AND METHOD OF PROCESSING A CYLINDRICAL SLIDING SURFACE

(71) Applicant: Hoffmann GmbH Qualitätswerkzeuge, Munich (DE)

(72) Inventors: Martin Barth, Oberasbach (DE); Jürgen Lukas, Nuremberg (DE); Josef Lifka, Furth (DE)

(73) Assignee: HOFFMANN GMBH QUALITÄTSWERKZEUGE, Munich (DE)

( * ) Notice: Subject to any disclaimer, the term of this patent is extended or adjusted under 35 U.S.C. 154(b) by 402 days.

(21) Appl. No.: 15/646,740

(22) Filed: Jul. 11, 2017

(65) Prior Publication Data
US 2018/0015591 A1    Jan. 18, 2018

(30) Foreign Application Priority Data
Jul. 12, 2016  (EP) .................................. 16179035

(51) Int. Cl.
| | |
|---|---|
| *B24B 39/02* | (2006.01) |
| *B23P 9/00* | (2006.01) |
| *B21H 7/18* | (2006.01) |
| *B23P 9/02* | (2006.01) |
| *B24B 33/02* | (2006.01) |

(52) U.S. Cl.
CPC ............ *B24B 39/023* (2013.01); *B21H 7/182* (2013.01); *B23P 9/00* (2013.01); *B23P 9/025* (2013.01); *B24B 33/02* (2013.01)

(58) Field of Classification Search
CPC ........ B21H 7/18; B21H 7/182; B24B 39/023; B24B 33/02; B24B 39/003; B24B 39/045; B23P 9/025; B23P 9/00; B23P 9/02
(Continued)

(56) References Cited

U.S. PATENT DOCUMENTS 2,254,674 A * 9/1941 Christman ............ B24B 39/045
72/111
3,504,513 A * 4/1970 Black ...................... B21C 37/30
29/507
(Continued)

FOREIGN PATENT DOCUMENTS

CN    203343170    12/2013
CN    104625558    5/2015
(Continued)

OTHER PUBLICATIONS

Machine translation of DE102013018899, Hahn, translated on Mar. 25, 2019, pp. 1-13. (Year: 2019).*
(Continued)

*Primary Examiner* — Teresa M Ekiert
(74) *Attorney, Agent, or Firm* — Greenblum & Bernstein, P.L.C.

(57) ABSTRACT

Processing tool for processing a surface of a workpiece. The processing tool includes a tool body which defines a tool axis. At least one first roll element, which is borne by the tool body, is rotatable around a first roll element axis and has a first outer surface with a rough surface structure in at least one first working section configured for rolling contact with the workpiece surface. Further, at least one second roll element, which is borne by the tool body, is rotatable about a second roll element axis and has a second outer surface that, in at least one second working section configured for a rolling contact with the workpiece surface, has a distance (r2) to the tool axis, which is less than a distance (r1) of the at least one first working section to the tool axis.

12 Claims, 2 Drawing Sheets

(58) Field of Classification Search
USPC .................................................. 72/75, 112
See application file for complete search history.

(56) References Cited

U.S. PATENT DOCUMENTS

| | | | |
|---|---|---|---|
| 3,824,827 A * | 7/1974 | Stockbridge | B21C 37/20 |
| | | | 406/191 |
| 8,961,265 B2 * | 2/2015 | Rauscher | B23Q 17/2471 |
| | | | 451/27 |
| 2013/0319063 A1 | 12/2013 | Schmid et al. | |
| 2016/0169149 A1 | 6/2016 | Hahn et al. | |

FOREIGN PATENT DOCUMENTS

| | | | | |
|---|---|---|---|---|
| CN | 105377486 | | 3/2016 | |
| DE | 10 2011 079 757 | | 5/2015 | |
| DE | 10 2013 018 899 | | 5/2015 | |
| DE | 102013018899 A1 * | | 5/2015 | ............... B23P 9/02 |
| EP | 2 871 022 | | 1/2013 | |
| JP | H10-235523 | | 9/1998 | |
| SU | 1488081 | | 6/1989 | |
| SU | 1780908 | | 12/1992 | |
| WO | 2012/084612 | | 6/2012 | |
| WO | 2015/003790 | | 1/2015 | |

OTHER PUBLICATIONS

Japan Office Action conducted in counterpart Japan Appln. No. 2017-134529 (dated May 16, 2018) (w/ English translation) 4 pages.

Hongkong Office Action conducted in counterpart Hongkong Appln. No. 201710564956.8 (dated Dec. 14, 2018) 14 pages.

* cited by examiner

PROCESSING TOOL, PARTICULARLY A ROLL TOOL, AND METHOD OF PROCESSING A CYLINDRICAL SLIDING SURFACE

CROSS-REFERENCE TO RELATED APPLICATIONS

The present application claims priority under 35 U.S.C. § 119(a) of European Patent Application No. 16 179 035.7-1702 filed Jul. 12, 2016, the disclosure of which is expressly incorporated by reference herein in its entirety.

BACKGROUND OF THE INVENTION

1. Field of the Invention

Embodiments of the invention relate to a processing tool, particularly a roll forming tool, for processing a surface of a workpiece, particularly a curved interior surface of a bore in a workpiece. The tool has a tool body, which defines a tool axis, and at least one first roll element borne by the tool body. The first roll element is rotatable around a first roll element axis and has a first outer surface with a rough surface structure in at least one working section that is intended for rolling contact with the workpiece surface.

Embodiments of the invention relate to a corresponding use of such a processing tool.

Embodiments of the invention relate to a method of processing a sliding surface of a cylinder of an internal combustion engine with a corresponding processing tool. The processing tool is rotated around the tool axis and is moved in a direction of advance along said tool axis. The processing tool is disposed in a cylinder bore that has grooves in the cylindrical sliding surface.

2. Discussion of Background Information

International Publication No. WO 2012/084612 A1, which involves generic technology of the general type described above, discloses a processing method for processing of a curved workpiece surface of a workpiece in a roll pressing operation. This involves rolling a roll element of a processing tool under a pressing pressure, against a region of the curved workpiece surface which is to be processed. An outer surface of the roll element has a rough surface structure, in at least one working section intended for rolling contact with the workpiece surface. The pressing pressure is adjusted such that, in the rolling process, a rough roll pressing structure is produced by local deformation of the workpiece material without material in the processed region of the workpiece surface.

The processing technique may be used, e.g., for processing the inner surface of a bore in a workpiece, and particularly to roughen the workpiece surface prior to coating. A corresponding processing tool is also illustrated in this International publication. An example of processing of a workpiece serves to prepare the inner sliding surface of a cylinder of an internal combustion engine prior to applying a coating that has a low frictional resistance.

The processing with the processing tool serves to provide a surface structure of the inner surface of a cylinder which structure is capable of holding a coating in a stabile manner. Prior to use of such a processing tool, customarily grooves are formed in the inner surface of the cylinder. This groove formation may be, e.g., by machining or sawing, as described in International Publication No. WO 2015/003790 A1, or by treatment with laser beams.

The working sections with a rough surface structure, which are described in WO 2012/084612 A1, typically have granules of hard material which are disposed in a matrix of softer material. When high pressing pressures are employed, excessive forces may develop, whereby the granules of hard material are released from the matrix structure.

SUMMARY OF THE EMBODIMENTS

Embodiments of the present invention are directed to a processing tool, a use of a processing tool, and a method for processing a cylindrical sliding surface of an internal a combustion engine. According to embodiments, the risk of the removal of hard material granules and the risk of plastic deformation of the rough surface structure of a working section of a roll element of the processing tool are minimized.

In embodiments, a processing tool, particularly a roll tool, for processing a surface of a workpiece, particularly a curved interior surface of a bore in a workpiece, is provided. The tool has a tool body, which defines a tool axis, and at least one first roll element borne by the tool body. The first roll element is rotatable around a first roll element axis and has a first outer surface with a rough surface structure in at least one working section intended for rolling contact with the workpiece. The tool also has at least a second roll element borne by the tool body. The second roll element is rotatable about a second roll element axis and has a second outer surface that, in at least one working section intended for a rolling contact with the workpiece surface, has a distance to the tool axis which is less than the distance of the working section of the first roll element to the tool axis.

Preferably, the raw surface structure in the working section of the first outer surface of the first roll element is formed by or is comprised of granules of hard material which project in the radial direction. Preferred hard material granules have a mean particle size greater than 15 microns and preferably between 30 and 200 microns. In this regard, the radial distance or the distance between the first outer surface of the first rolling element and the tool axis refers to the mean distance between the outer surface of the hard material grains and the tool axis. In particular, the mean distance is determinable from an average distance of the hard material particles protruding from the working section of the first rolling element or the workpiece surface to the tool axis.

Via the processing tool according to embodiments, a division of the work can be provided, such that the working section of the second outer surface of the second roll element is subjected to a pre-pressing of the workpiece or respectively the workpiece surface, and then, by the working section of the first roll element, a rough surface structure is produced on the workpiece via the rough surface structure or respectively by the hard material granules which define the rough surface structure. Preferably, both the first roll element and the second roll element are pressed against the surface of the workpiece with a pre-definable pressing pressure.

Preferably, the working section of the second roll element is smooth. In particular, the working section of the second roll element is preferably comprised of steel, more preferably a hardened steel.

Preferably, the working section of the first roll element has outwardly projecting elevations comprised of a hard material, such as a hard metal, diamond, corundum, or cubic boron nitride. Preferably, the hard material granules are of a type described supra, with mean particle size as described supra. Preferably, these hard material granules are disposed in a solder matrix, e.g. comprised of copper and tin. With this arrangement, the hard material granules project radially outward from the solder matrix.

Preferably, the working section of the first roll element is disposed axially behind the working section of the second roll element, with respect to a direction of advance of the processing tool along the tool axis. With this arrangement, first the workpiece surface is subjected to pre-pressing, or respectively, plastic deformation, followed by roughening of the workpiece surface.

Preferably, the working section of the first roll element is disposed axially behind the working section of the second roll element, with respect to a direction of advance of the processing tool along the tool axis, in a direction of advance which is opposite to the above-described direction of advance of the processing tool. With this arrangement, once a surface is roughened, it is not subsequently smoothed by a following working section of a second roll element. This preferred embodiment is achieved in particular in that the first roll element is mounted so as to be displaceable in the axial direction.

Preferably, the rotational axes of the roll elements are oriented parallel to the tool axis.

Preferably, a cage-type (or cage) receptacle is provided for the at least one first roll element(s), and a cage-type (or cage) receptacle is provided for the at least one second roll element(s). A longitudinal extent of the cage-type receptacle(s) for the at least one first roll element(s) in the axial direction is greater than the longitudinal extent of the at least one first roll element(s), so as to provide for a pre-determinable axial displacement of the first roll element(s).

Preferably, the cage-type receptacle for the at least one first roll element is configured such that, in the course of a processing operation, with movement of the processing tool in the axial direction of advance, the at least one first roll element is supported against the rear end.

For this purpose, the cage-type receptacle for the at least one first roll element has a rear stop. Preferably, the rear stop is disposed behind the rear stop for the at least one second roll element, in the axial direction of advance.

Preferably, the cage-type receptacle for the at least one second roll element has an axial length which serves to fix the second roll element in the axial direction. Thus, the second roll element is not, or respectively, is essentially not displaceable in the axial direction, but rather its axial position is fixed.

Preferably, the cage-type receptacles have axial center positions which are at the same height in relation to the tool axis. In this way, it is provided that the height in the radial direction, or respectively, the height in a plane perpendicular to the tool axis is the same.

Preferably, the cage-type receptacles are fabricated from different material from the material of the roll elements.

Preferably, a plurality of first roll elements and a plurality of second roll elements are provided. Preferably, first roll elements and second roll elements alternate in the circumferential direction of the processing tool.

Embodiments are directed to a use of the above-described processing tool for rolling or honing of a sliding surface of a cylinder of an internal combustion engine, where the surface has grooves.

Additionally, embodiments are directed to a method of processing a sliding surface of a cylinder of an internal combustion engine, with the above-described processing tool. The processing tool is rotated around the tool axis and is inserted into a cylinder bore with a grooved cylindrical sliding surface. The tool is movable in a direction of advance along the tool axis. Further, the method includes that the at least one first roll element and the at least one second roll element are caused to be rotated by the contact with the cylindrical sliding surface. The working section of the at least one second roll element serves to compress the material of the cylindrical sliding surface, so as to give rise to an undercut configuration at the ridges which ridges surround the grooves, and the working section of the at least one first roll element serves to roughen the inner surface of the compressed ridges.

The inventive method enables very reliable processing of the workpiece surface. In particular, no material which is responsible for the rough surface structure of the working section of the first roll element is released. In particular, said rough surface structure is formed by hard material granules which project radially out of the first roll element, in particular radially out of the working section of the first roll element.

Preferably, the working section of the at least one first roll element is disposed behind the working section of the at least one second roll element, in the direction of advance.

Preferably, if the direction of advance is reversed, the working section of the at least one first roll element is also disposed behind the working section of the at least one second roll element. This provides for very clean and exact processing of the workpiece surface.

Additional features of the invention will be apparent from the description of inventive embodiments, together with the claims and the accompanying drawings. Inventive embodiments may be realized from individual features or combinations of individual features.

Embodiments are directed to a processing tool for processing a surface of a workpiece. The processing tool includes a tool body which defines a tool axis. At least one first roll element, which is borne by the tool body, is rotatable around a first roll element axis and has a first outer surface with a rough surface structure in at least one first working section configured for rolling contact with the workpiece surface. Further, at least one second roll element, which is borne by the tool body, is rotatable about a second roll element axis and has a second outer surface that, in at least one second working section configured for a rolling contact with the workpiece surface, has a distance (r2) to the tool axis, which is less than a distance (r1) of the at least one first working section to the tool axis.

According to embodiments, the processing tool can be a roll forming tool arranged for processing a curved interior surface of a bore in the workpiece.

In accordance with other embodiments, the at least one second working section of the second roll element can be smooth.

In embodiments, the at least one first working section of the first roll element can have outwardly projecting elevations that include a hard material. The hard material may include a hard metal, diamond, corundum, or cubic boron nitride.

According to further embodiments, the processing tool may be configured to advance along the tool axis. With respect to a first direction of advance along the tool axis, the at least one first working section of the first roll element can be disposed axially behind the at least one second working section of the second roll. Further, with respect to a second direction of advance opposite the first direction of advance, the at least one first working section of the first roll element may be disposed axially behind the at least one second working section of the second roll element.

In further embodiments, the processing tool can further include at least one first cage-type receptacle for the at least one first roll element, and at least one second cage-type receptacle for the at least one second roll element. In an axial direction, the at least one first cage-type receptacle can have a longitudinal extent that is greater than a longitudinal extent of the at least one first roll element so that the at least one first roll element is axially displaceable a pre-determinable amount. Moreover, the at least one first cage-type receptacle for the at least one first roll element may have axial ends configured to support, with respect to a direction of advance along the tool axis in a processing operation, a trailing end of at least one first roll element. The at least one second cage-type receptacle for the at least one second roll element may have an axial length which serves to fix the at least one second roll element in the axial direction. Further, the at least one first cage-type receptacle and the at least one second cage-type receptacle can have axial center positions which are at a same height in relation to the tool axis.

Embodiments of the invention are directed to a method for rolling or honing of a sliding surface of a cylinder of an internal combustion engine with the above-described processing tool. The surface to be rolled or honed has grooves. The method includes rotating the tool body about the tool axis; processing the surface with the at least one second roll element and processing the surface with the at least one first roll element.

Embodiments are directed to a method of processing a sliding surface of a cylinder of an internal combustion engine, by the above-described processing tool. The method includes rotating the processing tool around the tool axis; inserting the processing tool into a cylinder bore with ridges and grooves in the cylindrical sliding surface; and moving the processing tool in a direction of advance along the tool axis. The at least one first roll element and the at least one second roll element are rotated by the contact with the cylindrical sliding surface. The method further includes compressing the material of the cylindrical sliding surface with the second working section of the at least one second roll element to form an undercut configuration at the ridges that extend into the grooves and roughening an inner surface of the compressed ridges with the first working section of the at least one first roll element.

According to embodiments of the invention, with respect to a direction of advance of the processing tool along the tool axis, the first working section of the at least one first roll element can be disposed behind the second working section of the at least one second roll element.

In accordance with other embodiments, with respect to a first direction of advance of the processing tool along the tool axis, the first working section of the at least one first roll element can be disposed behind the second working section of the at least one second roll element, and with respect to a second direction of advance of the processing tool along the tool axis opposite the first direction, the first working section of the at least one first roll element can be disposed behind the second working section of the at least one second roll element.

Embodiments of the invention are directed to a processing tool for processing a grooved surface of a workpiece. The processing tool includes a tool body rotatable around and movable along a tool axis. At least one first roll element is coupled to the tool body to be aligned in a tool axis direction and to be rotatable around a first roll element axis and at least one second roll element is coupled to the tool body to be axially aligned with and movable in the tool axis direction and to be rotatable around a second roll element axis. The at least one second roll element has at least one second working section configured to compress ridges in the grooved surface; and the at least one first roll element has at least one first working section configured to roughen the compressed ridges in the grooved surface.

According to embodiments, as the tool body is moved along the tool axis, the at least one second roll element can be axially moved so that, with respect to a direction of movement of the tool body, the at least one second working section trails the at least one first working section.

In other embodiments, a radial distance from the tool axis to an outermost surface of the at least one second working surface can be less than a radial distance from the tool axis to an outermost surface of the at least one first working surface.

In accordance with still yet other embodiments of the present invention, the at least one second working section can be smooth and the at least one first working section may include a rough surface structure. The rough surface can include hard material granules embedded in a matrix.

Other exemplary embodiments and advantages of the present invention may be ascertained by reviewing the present disclosure and the accompanying drawing.

BRIEF DESCRIPTION OF THE DRAWINGS

The invention will be described below, without limiting the scope of the overall inventive concept, with reference here to exemplary embodiments and with the aid of the accompanying drawings, in connection with which express reference is made to the drawings concerning any components not explicitly described in the text. In the drawings.

DETAILED DESCRIPTION OF THE EMBODIMENTS

Figure 1:
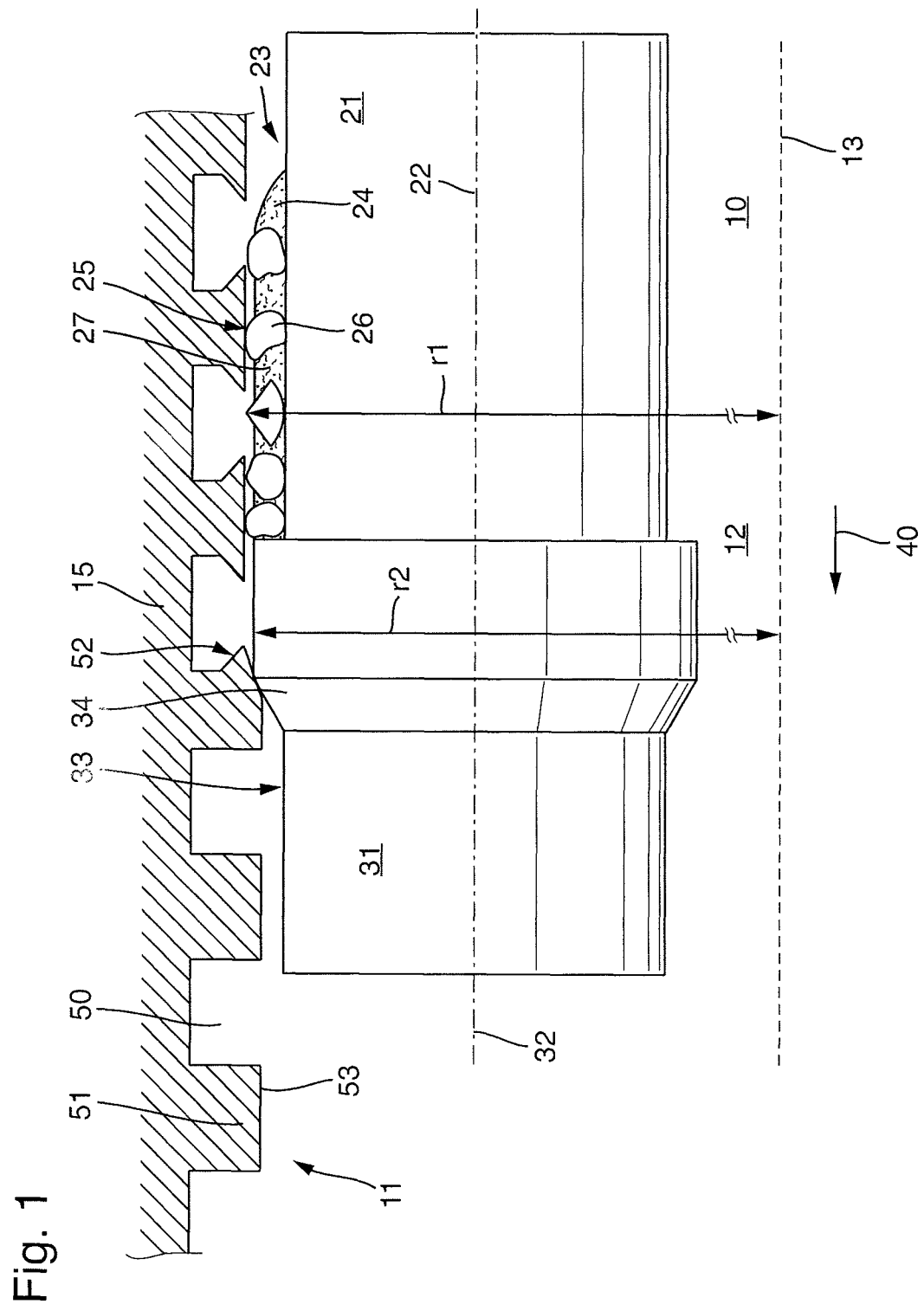
FIG. 1 is a schematic partially cross sectional representation of a part of an inventive processing tool.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the drawings, the same or similar elements and/or component parts are provided with the same reference numerals, and said elements and parts are not re-described in each instance.

FIG. 1 is a schematic view of an inventive processing tool 10, which may also be described as a "rolling tool". The processing tool 10 has a tool body 12 with a tool axis 13. Processing tool 10 is driven in rotation around tool axis 13, and is also moved axially, e.g., in a direction of advance 40.

Roll elements 21 and 31, which can be referred to as "rolling rollers," are provided at an outer periphery of processing tool 10. While FIG. 1 shows two different roll elements simultaneously, i.e., a first roll element 21 and a second roll element 31, these elements are circumferentially spaced from each other, i.e., disposed one behind the other in the circumferential direction of processing tool 10. This is indicated schematically by the wavy lines between the two roll elements 21 and 31.

Processing tool 10 serves to machine a cylindrical surface 11 which has grooves 50 and ridges 51. Grooves 50 are due to the surface being previously processed, e.g., cut with saw blades. Other alternative manners of producing the grooves might be, e.g., laser machining or milling.

Processing tool 10 acts upon an inner surface 53 of cylinder sliding surface 11 in such a way that a pressing gives rise to or forms undercuts 52, e.g., in ridges 51, and inner surface 53 becomes roughened. In the prior art according to WO 2012/084612 A1 or EP 2 871 022 A1, this result is accomplished by a roller tool which has a working section, in the case of roll elements, where granules of hard material are introduced which enable the surface to be compressed and enable the surface to be roughened.

According to embodiments of the invention, two different roll elements are provided, i.e., a first roll element 21 and a second roll element 31, which can be rotatably driven around respective roll element axes 22, 32. Second roll element 31, which is disposed, with reference to the direction of advance 40, ahead of first roll element 21, serves to compress ridges 51 in such a way that undercuts 52 are generated. In order to produce this compression/generation of undercuts, a working section 34 is provided with a surface located at a distance r2 from tool axis 13. Distance r2 is somewhat smaller than a distance r1 of hard material granules 26 provided in working section 24 of first roll element 21 from tool axis 13. For this purpose, the hard material granules 26, e.g. diamond granules, are embedded in a solder matrix 27, e.g. comprised of copper and tin. This embedding of hard particles 26 in solder matrix 27 result in elevations 25 which extend above solder matrix 27 to subject surface 53 to surface working, after having first been compressed by working section 34 of second roll element 31. As a result of this configuration of processing tool 10, the force applied to hard material granules 26 of first roll element 21 is less than according to the prior art. Consequently, release/loss of these hard material granules is avoided.

According to the embodiments, processing tool 10 is structured so that exactly the same phenomena occurs when to tool is moved in a direction opposite direction of advance 40, i.e., the pressing by second roll element 31 precedes the roughening brought about via first roll element 21. This feature is schematically illustrated in views of processing tool 10 in FIGS. 2 and 3. In particular, processing tool 10 includes (first) cage-type (or cage) receptacles 41, which are provided to bear first roll elements 21 and have a longitudinal extent which is greater than the longitudinal extent of first roll elements 21. As a result, first roll elements 21 can be axially displaced or moved in the longitudinal axial direction, i.e., parallel to tool axis 13. (Second) cage-type (or cage) receptacles 41' of second roll elements 31 are adapted to the length of said second roll elements 31, e.g., exactly adapted, so that the second roll elements cannot be displaced in the longitudinal axial direction.

Figure 2:
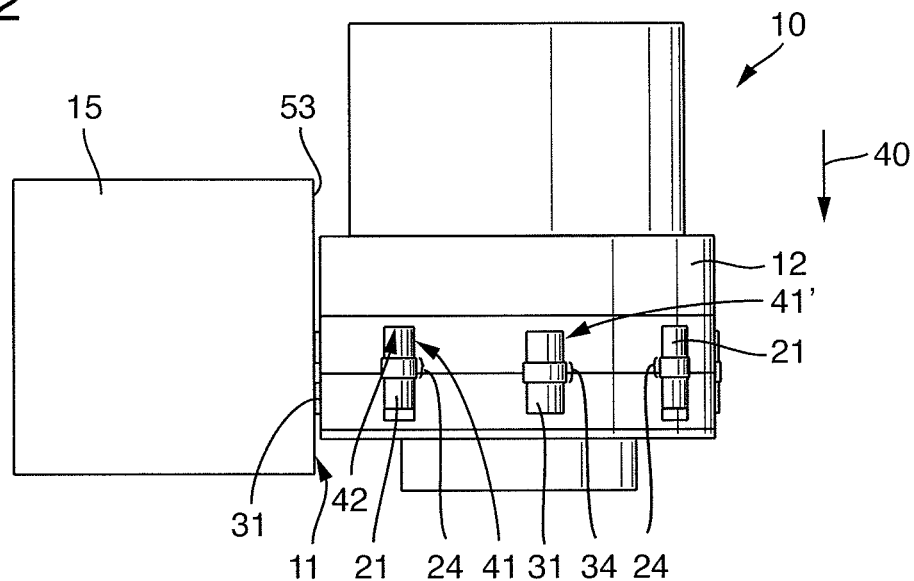
FIG. 2 is a schematic view of an inventive processing tool in a first direction of advance.

In FIG. 2, a processing step in the direction of advance 40 is illustrated. It can be seen here that first roll elements 21 rest against a rear stop 42 in cage-type receptacles 41. In the direction of advance, at the front, it can be seen that a space is provided in the cage-type receptacles 41. FIG. 2 also shows that a plurality of roll elements are provided, wherein first roll elements 21 and second roll elements 31 alternate in the circumferential direction of processing tool 10. Working section 24 of first roll element 21 and working section 34 of the second roll element 31 are also shown. A workpiece 15, having an inner surface 53 which is to be worked upon, is schematically illustrated.

Preferably, workpiece 15 being processed by processing tool 10 is a cylindrical sliding surface of a cylinder of an internal combustion engine. This sliding surface can be grooved.

Figure 3:
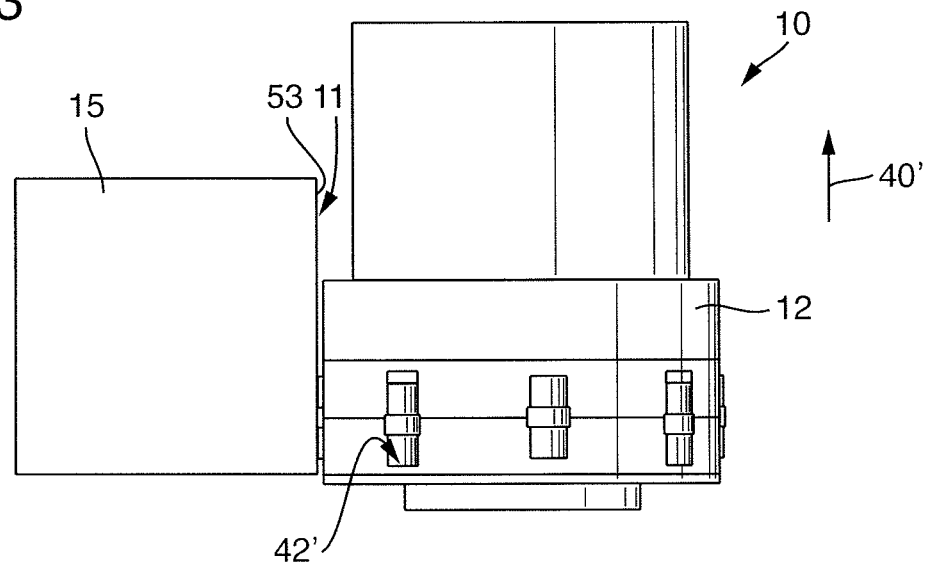
FIG. 3 is a schematic view of the inventive processing tool according to FIG. 2, in an opposite direction of advance.

In an opposite direction of advance 40', which is illustrated in FIG. 3, each of first roll elements 21 rest against the other rear end 42' of respective cage-type receptacles 41, or respectively, in the direction of advance 40 against the front end of its respective cage-type receptacle 41.

Cage-type receptacles 41 and 41' are provided, e.g., as a brass cage, so that roll elements 21, 31, which preferably are comprised of steel, do not become seized in cage-type receptacles 41, 41'.

In the exemplary embodiments described here, roll elements 21, 31 have a cylindrical shape. However, it is understood that the shape of the roll elements may also be conical, as illustrated in EP 2 871 022 A1.

All of the features which are disclosed, including but not limited to features disclosed only in the drawings, and features disclosed in combination with other features, should be deemed to be essential to the invention, individually and in combinations. Embodiments according to the invention can be realized by individual features or a combination of a plurality of features. In the scope of the invention, features which are described with "in particular" or "preferred" are to be understood as optional features.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

10 Processing tool.
11 Cylindrical sliding surface.
12 Tool body.
13 Tool axis.
15 Workpiece.
21 First roll element.
22 Axis of first roll element.
23 First external surface.
24 First working section.
25 Elevation.
26 Granule of hard material.
27 Solder matrix.
31 Second roll element.
32 Axis of second roll element.

33 Second external surface.
34 Second working section.
40 Direction of advance.
40' Opposite direction of advance.
41 first cage-type receptacle.
41' second cage-type receptacle.
42 Rear end.
42' Rear end.
50 Groove.
51 Ridge.
52 Undercut feature.
53 Interior surface.
r1 (Distance)
r2 (Distance)

What is claimed:

1. A processing tool for processing a surface of a workpiece, comprising:
    a tool body which defines a tool axis;
    at least one first roll element, which is carried by the tool body, is rotatable around a first roll element axis and has a first outer surface with a surface structure in at least one first working section configured for rolling contact with the workpiece surface;
    at least one second roll element, which is carried by the tool body, is rotatable about a second roll element axis and has a second outer surface that, in at least one second working section configured for a rolling contact with the workpiece surface, has a distance (r2) to the tool axis, which is less than a distance (r1) of the at least one first working section to the tool axis; and
    at least one first cage receptacle for the at least one first roll element, and at least one second cage receptacle for the at least one second roll element,
    wherein, in an axial direction, the at least one first cage receptacle has a longitudinal extent parallel to the first roll element axis that is greater than a longitudinal extent of the at least one first roll element so that the at least one first roll element is axially displaceable a predeterminable amount, and
    wherein the surface structure in the at least one first working section is rougher than the at least one second working section of the second roll element.

2. The processing tool according to claim 1, wherein the processing tool is a roll forming tool arranged for processing a curved interior surface of a bore in the workpiece.

3. The processing tool according to claim 1, wherein the at least one first working section of the first roll element has outwardly projecting elevations that include a material harder than the surface of the workpiece to be processed.

4. The processing tool according to claim 3, wherein the material comprises a metal, diamond, corundum, or cubic boron nitride.

5. The processing tool according to claim 1, wherein the tool body is configured to advance along the tool axis,
    wherein, with respect to a first direction of advance along the tool axis, the at least one first working section of the first roll element is disposed axially behind the at least one second working section of the second roll.

6. The processing tool according to claim 5, wherein, with respect to a second direction of advance opposite the first direction of advance, the at least one first working section of the first roll element is disposed axially behind the at least one second working section of the second roll element.

7. The processing tool according to claim 1, wherein the at least one first cage receptacle for the at least one first roll element has axial ends configured to support, with respect to a direction of advance along the tool axis in a processing operation, a trailing end of at least one first roll element.

8. The processing tool according to claim 1, wherein the at least one second cage receptacle for the at least one second roll element has an axial length which serves to fix the at least one second roll element in the axial direction.

9. The processing tool according to claim 1, wherein the at least one first cage receptacle and the at least one second cage receptacle have axial center positions which are at a same height in relation to the tool axis.

10. A method for rolling or honing of a sliding surface of a cylinder of an internal combustion engine with the processing tool according to claim 1, wherein the surface to be rolled or honed has grooves, the method comprising:
    rotating the tool body about the tool axis;
    processing the surface with the at least one second roll element; and
    processing the surface with the at least one first roll element,
    wherein, with respect to a direction of advance of the processing tool along the tool axis, the first working section of the at least one first roll element is disposed behind the second working section of the at least one second roll element.

11. A method of processing a sliding surface, having grooves and ridges, of a cylinder bore of an internal combustion engine, by the processing tool according to claim 1, the method comprising:
    rotating the processing tool around the tool axis;
    inserting the processing tool into the cylinder bore,
    moving the processing tool in a direction of advance along the tool axis,
    wherein the at least one first roll element and the at least one second roll element are rotated by the contact with the cylindrical sliding surface,
    compressing the ridges of the cylindrical sliding surface with the second working section of the at least one second roll element to form an undercut configuration at the ridges that extend into the grooves; and
    roughening an inner surface of the compressed ridges of the cylindrical sliding surface with the first working section of the at least one first roll element,
    wherein, with respect to a direction of advance of the processing tool along the tool axis, the first working section of the at least one first roll element is disposed behind the second working section of the at least one second roll element.

12. The method according to claim 11, wherein the direction of advance comprises a first direction and a second direction,
    wherein, with respect to the first direction of advance of the processing tool along the tool axis, the first working section of the at least one first roll element is disposed behind the second working section of the at least one second roll element, and
    wherein, with respect to the second direction of advance of the processing tool along the tool axis opposite the first direction, the first working section of the at least one first roll element is disposed behind the second working section of the at least one second roll element.

* * * * *